(12) United States Patent
Beille

(10) Patent No.: US 11,239,483 B2
(45) Date of Patent: Feb. 1, 2022

(54) STACK OF REDOX-FLOW ELECTROCHEMICAL CELLS WITH DECREASED SHUNT

(71) Applicant: KEMIWATT, Rennes (FR)

(72) Inventor: Florent Beille, Rennes (FR)

(73) Assignee: KEMIWATT, Rennes (FR)

( * ) Notice: Subject to any disclaimer, the term of this patent is extended or adjusted under 35 U.S.C. 154(b) by 53 days.

(21) Appl. No.: 16/556,995

(22) Filed: Aug. 30, 2019

(65) Prior Publication Data
US 2020/0075984 A1 Mar. 5, 2020

(30) Foreign Application Priority Data
Sep. 3, 2018 (FR) ...................... 18 57898

(51) Int. Cl.
| | |
|---|---|
| *H01M 8/18* | (2006.01) |
| *H01M 8/0258* | (2016.01) |
| *H01M 8/0273* | (2016.01) |
| *H01M 8/2455* | (2016.01) |
| *H01M 8/026* | (2016.01) |

(52) U.S. Cl.
CPC ........... *H01M 8/188* (2013.01); *H01M 8/026* (2013.01); *H01M 8/0258* (2013.01); *H01M 8/0273* (2013.01); *H01M 8/2455* (2013.01)

(58) Field of Classification Search
None
See application file for complete search history.

(56) References Cited

U.S. PATENT DOCUMENTS

| | | | | | |
|---|---|---|---|---|---|
| 5,851,694 | A | * | 12/1998 | Miyabayashi | ...... H01M 8/0273 429/105 |
| 2017/0229715 | A1 | * | 8/2017 | Chou | .................. H01M 8/0258 |

FOREIGN PATENT DOCUMENTS

| | | |
|---|---|---|
| EP | 2980903 A1 | 2/2016 |
| FR | 3059469 A1 | 6/2018 |
| KR | 20150088034 A | 7/2015 |

OTHER PUBLICATIONS

Search Report for French Application 18 57898 dated Jun. 28, 2019.

* cited by examiner

*Primary Examiner* — Eugenia Wang
(74) *Attorney, Agent, or Firm* — Pearne & Gordon LLP

(57) ABSTRACT

The invention relates to a stack of several electrochemical cells stacked on top of one another in a stacking direction. The stack comprises at least: a first electrochemical cell, a second electrochemical cell, and an intercalary plate. Each cell includes an upper frame housing a first electrode and a lower frame housing a second electrode, the first electrode and the second electrode being separated from one another by a membrane. The second electrode of the first electrochemical cell and the first electrode of the second electrochemical cell are separated by an intercalary plate. The stack includes an intercalary frame arranged on the periphery of the intercalary plate.

14 Claims, 5 Drawing Sheets

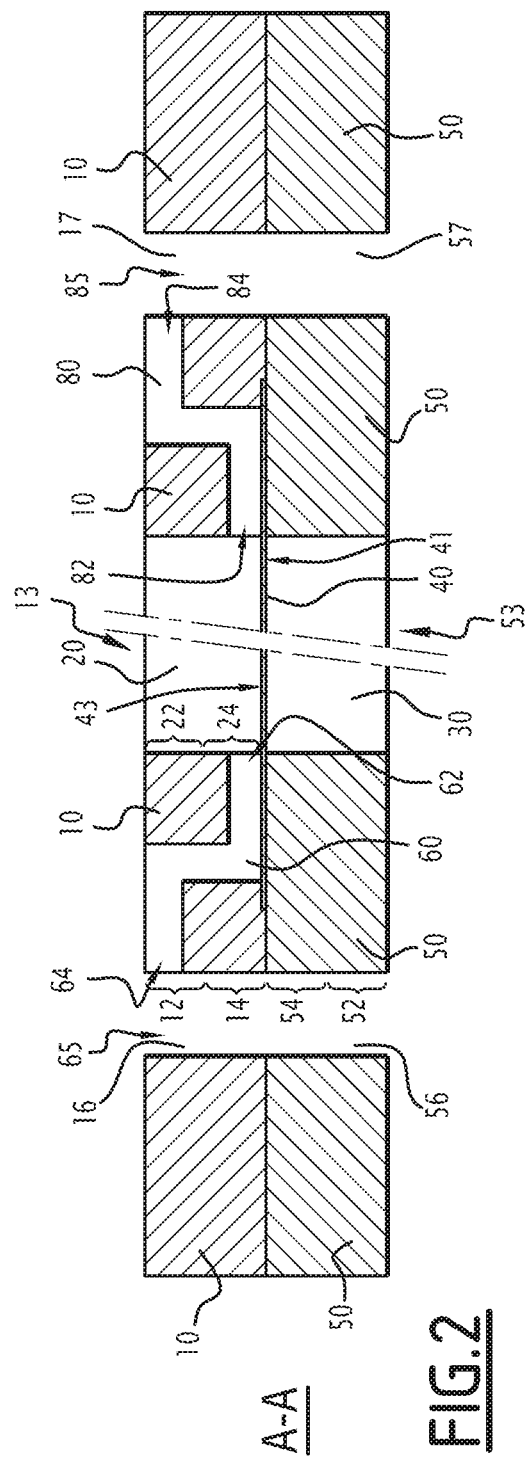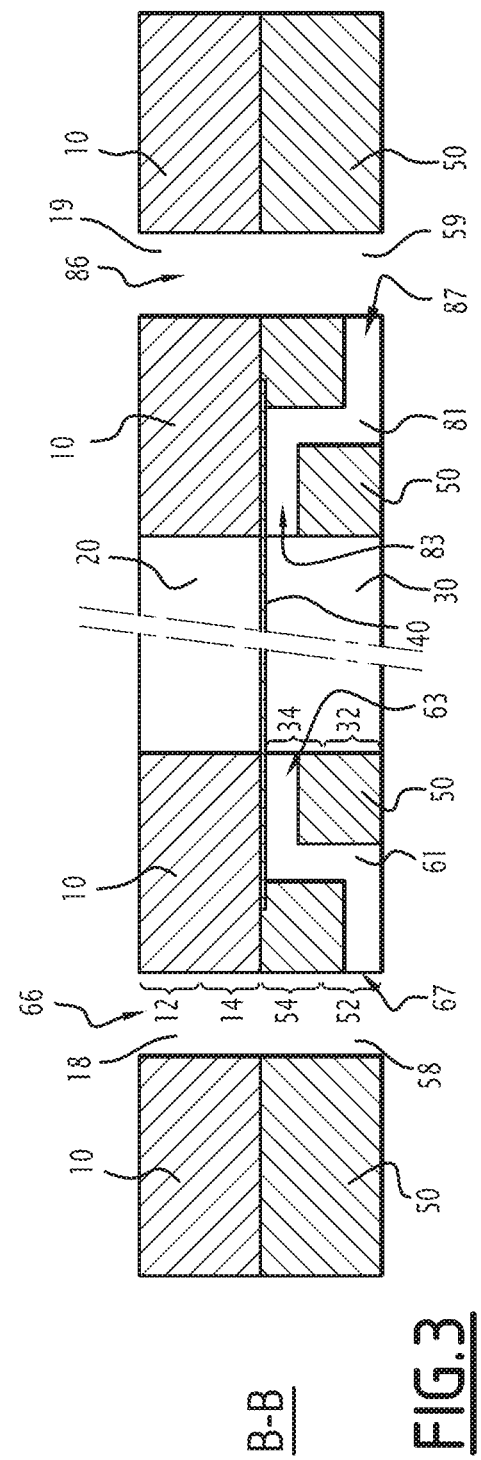

STACK OF REDOX-FLOW ELECTROCHEMICAL CELLS WITH DECREASED SHUNT

FIELD OF THE INVENTION

The present invention relates to the field of electrochemical cells comprising electrodes separated by a membrane, in particular redox-flow electrochemical cells. The present invention in particular relates to a stack of electrochemical cells. The invention also relates to a flow-redox battery, as well as a method for producing current.

PRIOR ART

In the field of the invention, a stack refers to a stack of electrochemical cells typically comprising the stack of at least two electrochemical cell electrodes generally kept compressed with one another, and separated from one another by a permeable ion exchange membrane, frames housing electrodes and providing the sealing, supply and distribution of electrochemical fluids in the electrochemical cell. The stack also comprises two collector plates providing the supply and collection of electric current.

The frames of the stack must provide the sealing of the assembly. This sealing is traditionally done by seals housed in housings of the frames dedicated to that purpose. The frames also provide the fluid supply of the cells using channels. This electrochemical flow supply must be as homogeneous as possible in order to provide the greatest possible planar operating homogeneity.

In general, the electrochemical cells comprising an ion exchange membrane are separated sealably into two zones, one making up an anode compartment and the other a cathode compartment separated by the ion exchange membrane. The inner sealing of the electrochemical cell is an essential issue for the proper working of the cell.

A stack generally has a flow of electrochemical fluids in parallel and an electrical stack of electrochemical cells in series. For the cells connected in series, a shunt current phenomenon may appear between the cells due to the presence of highly conductive electrolytes in the electrochemical fluids. Thus, the current will circulate along the fluid currents rather than through the electrochemical cells, causing a loss of efficiency.

Furthermore, electrolytes may come into contact and cause the corrosion of the components of the stack, in particular of the graphite plates arranged between the different electrodes of the stack.

To avoid the corrosion of the graphite plates, application FR 3,059,469 by Kemwatt proposes to electrically insulate the conductive zones in contact with the electrolytes and located outside the active surface, in particular by adding an insulating film or a nonconductive coating on the plates.

However, this adds an additional cost during the production of the cell. Furthermore, the electrochemical cells may operate over very substantial durations, a battery being able to have more than 10,000 charge/discharge cycles over approximately twenty years. Electrolytes are able to migrate between the insulating film and the graphite plate, after a deterioration of the adhesive or the wear of the film, and to corrode the graphite plates, leading to leaks of the electrochemical fluids and possible mixing of the electrolytes. Furthermore, the presence of a flaw on the film or incorrect positioning thereof creates a very substantial risk of corrosion.

Application FR 3,059,469 by Kemwatt also proposes to protect the graphite plates from corrosion by cleaning them in plastic frames. To that end, spot facings are made in the plastic distribution frame and the graphite plates are arranged inside these spot facings to limit the zones potentially in contact with the electrolytes. However, these spot facings are very thin, typically around several hundredths of micrometers to several millimeters, and are therefore complex to make. This in particular requires high machining precisions, which may incur substantial excess costs. Furthermore, the risk of leaks is high in case of noncompliance with the allowances. It is in fact difficult to have small allowances for plastic materials, typically less than about 100 microns, due to the expansion of the plastic in the heat during machining. Yet given the fineness of the cells of the stacks, the seals of the cells are from 1 to several millimeters thick only, which represents compressions of several hundreds of microns. The machining flaws of the spot facing can accumulate with the machining of the seal grooves and lead to difficulties in sealing the cells.

AIMS OF THE INVENTION

The present invention aims to provide an electrochemical cell making it possible to reduce shunt currents, in particular in electrochemical cells mounted fluidly in parallel.

The present invention aims to provide an electrochemical cell providing good sealing, in particular at the ion exchange membrane. This sealing is in fact crucial for the operation of an electrochemical battery, since an internal leak would cause mixing of the electrolytes and a rapid and irreversible loss of its capacity. The present invention aims to avoid these drawbacks.

The present invention also aims to provide an electrochemical cell that is easy to assemble and/or disassemble, and having a good lifetime.

The present invention also aims to limit the production costs of a stack of electrochemical cells, in particular in the field of redox-flow electrochemical cells.

The complexity of these technical problems is in particular related to being capable of resolving all of them together, which the present invention proposes to resolve.

The present invention aims to resolve all of these technical problems reliably, industrially and at a low cost.

DESCRIPTION OF THE INVENTION

To resolve the technical problems, the invention relates to a stack of several electrochemical cells, the electrochemical cells being stacked on top of one another in a stacking direction, the stack comprising at least:
  a first electrochemical cell,
  a second electrochemical cell, and
  an intercalary plate.

Each cell includes an upper frame housing a first electrode and a lower frame housing a second electrode, the first electrode and the second electrode being separated from one another by a membrane, the first electrode being in contact with the membrane by its lower face and the second electrode being in contact with the membrane by its upper face, the second electrode of the first electrochemical cell and the first electrode of the second electrochemical cell being separated by the intercalary plate.

The stack includes an intercalary frame arranged on the periphery of the intercalary plate, the lower frame of the first electrochemical cell and the upper frame of the second electrochemical cell being separated at least in part by the intercalary frame, the lower frame of the first electrochemical cell facing the intercalary frame by its lower face and the upper frame of the second electrochemical cell facing the intercalary frame by its upper face.

The stack according to the invention may comprise one or more of the following features, considered alone or according to any technically possible combination(s):

The upper frame and the lower frame of each electrochemical cell are separated from one another by the membrane,
- each upper or lower frame comprising a proximal portion close to the membrane and a distal portion distant from the membrane,
- each upper or lower frame comprising a supply channel for supplying an electrochemical fluid and an inlet channel for a fluid supplying a lateral face of the electrode, the inlet channel comprising an outlet orifice in the proximal portion opening onto a lateral face of the electrode,
- each upper or lower frame comprising a discharge channel for an electrochemical fluid and an outlet channel for the fluid via a lateral face of the electrode, the outlet channel comprising an inlet orifice in the proximal portion opening onto a lateral face of the electrode,
- at least one, and preferably all, from among the inlet channel and the outlet channel comprising an inlet, respectively outlet orifice, opening onto the supply, respectively discharge channel, respectively, in the distal portion of the upper or lower frame.

At least one, and preferably all, from among the outlet orifice of the supply channel and the inlet orifice of the discharge channel of at least one upper or lower frame, opens onto the membrane.

The membrane comprises an upper face and a lower face, the inlet or outlet orifice(s) emerging on the membrane at the upper, respectively lower face, not being located opposite an orifice opening onto the membrane at the lower, respectively upper face.

The intercalary frame comprises an upper face and a lower face, at least one of said faces forming a wall of the inlet channel or the outlet channel.

The intercalary frame has a thickness greater than or equal to, preferably equal to, the thickness of the intercalary plate, said thicknesses being measured in a direction parallel to the direction of the stack.

Each upper or lower frame includes a housing for a sealing gasket, the sealing gaskets being in contact with the membrane.

An upper current collector plate, a lower current collector plate, an upper intercalary plate and a lower intercalary plate, the collector plates each being in contact with an upper, respectively lower intercalary plate, arranged between said collector plate and an electrode, the stack including a supply frame and a closing frame arranged on the periphery respectively of the assembly formed by the upper collector plate and the upper intercalary plate and the assembly formed by the lower collector plate and the lower intercalary plate.

The closing frame has no orifice opening onto the supply channel or the discharge channel.

The invention also relates to a flow-redox battery including a stack as described above.

The invention further relates to a method for producing electricity comprising implementing a stack as described above, or a battery as described above.

The invention will be better understood upon reading the following description, provided solely as an example, and in reference to the appended drawings, in which:

FIG. 2 shows a longitudinal sectional diagram of the stack according to one embodiment of the invention, at a supply channel and a discharge channel of the first electrode;

FIG. 3 shows a longitudinal sectional diagram of the stack according to one embodiment of the invention, at a supply channel and a discharge channel of the second electrode;

In the present invention, reference is made independently to the different elements by their reference number in the figures, with no limitation on the scope of the invention. The references to an element with several reference numbers indicate that the description generally applies to the element bearing the sign to which reference is made. Thus for example, a reference to the electrode 20, 30 means that the description generally and independently applies to the electrode 20 and the electrode 30.

Figure 1:
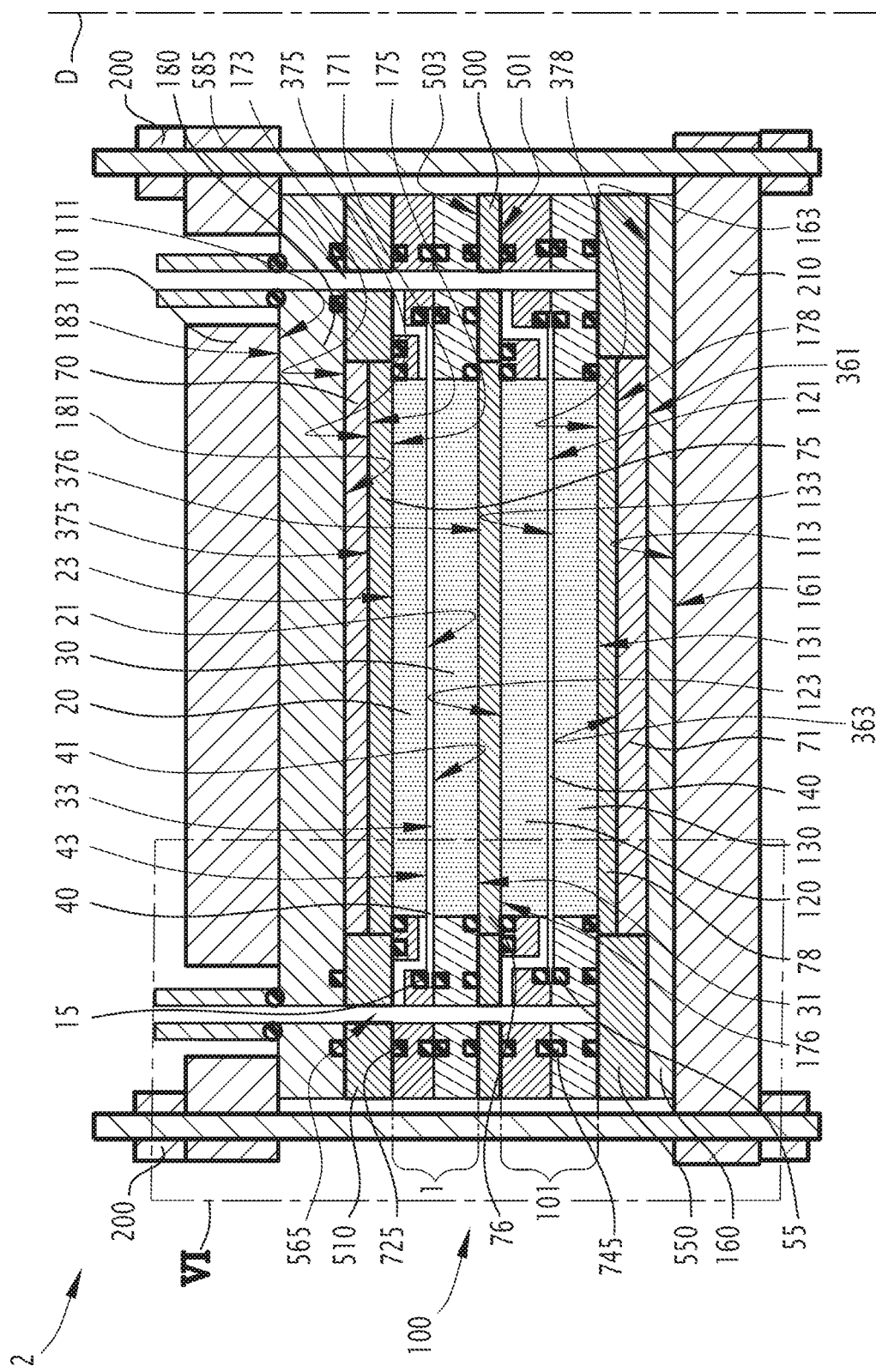
FIG. 1 shows a longitudinal sectional diagram of a stack according to one embodiment of the present invention.

A stack 100 of several electrochemical cells 1, 101 according to the invention is shown schematically in FIG. 1.

The stack 100 includes a first electrochemical cell 1, a second electrochemical cell 101, an intercalary plate 76 and an intercalary frame 500.

Preferably, the stack 100 includes a multitude of first electrochemical cells 1, second electrochemical cells 101, intercalary plates 76 and intercalary frames 500.

The electrochemical cells 1, 101 are stacked on top of one another in a stacking direction D. The stack 100 has a central axis A parallel to the stacking direction D and passing through the electrochemical cells 1, 101 substantially at their center.

The stack 100 preferably includes between two and one hundred electrochemical cells 1, 101, preferably between forty and sixty electrochemical cells 1, 101. In FIG. 1, purely as an illustration, the stack 100 includes two electrochemical cells 1, 101.

Electrochemical Cell

Frames

Each electrochemical cell 1, 101 comprises an upper frame 10 housing a first electrode 20 and a lower frame 50 housing a second electrode 30. The first electrode 20 and the second electrode 30 are separated by a membrane 40, as will be described hereinafter.

According to one embodiment, the upper frame 10 and the lower frame 50 are symmetrical and interchangeable. Thus, a single and same frame can form both the upper frame 10 and the lower frame 50 by simple reversal.

In general, the frames 10, 50 are made from thermoplastic polymer, for example Polypropylene (commonly referred to using the acronym PP). A frame is generally molded or machined and can also be printed, for example by three-dimensional printing.

At least one of the frames 10, 50 is preferably made from a material comprising pigments. Preferably, at least one of the frames 10, 50 is made from a black material.

In FIGS. 2 and 3, each frame 10, 50 comprises several supply channels 65, 66 and discharge channels 85, 86 for electrochemical fluids. These channels are known from the prior art and for example used to supply different electrochemical fluids to the electrodes of an electrochemical cell 1, 101.

The first supply channel 65 is intended to supply a first electrochemical fluid to the first electrode 20. The first discharge channel 85 is intended to discharge the first electrochemical fluid from the first electrode 20. The first discharge channel 85 is generally arranged opposite the first supply channel 65 relative to the central axis A of the stack 100, i.e., it is substantially symmetrical to the first supply channel 65 by rotation by an angle of 180° around the central axis A.

The second supply channel 66 is intended to supply a second electrochemical fluid to the second electrode 30. The second discharge channel 86 is intended to discharge the second electrochemical fluid from the second electrode 30. The second discharge channel 86 is generally arranged opposite the second supply channel 66 relative to the central axis A of the stack 100, i.e., it is substantially symmetrical to the second supply channel 66 by rotation by an angle of 180° around the central axis A.

The upper frame 10 generally comprises at least a first through hole 16, a second through hole 17, a third through hole 18 and a fourth through hole 19.

The lower frame 50 generally comprises at least a first through hole 56, a second through hole 57, a third through hole 58 and a fourth through hole 59.

Each first through hole 16, 56 is preferably transverse, perpendicular to the largest dimension of the respective frame 10, 50, and forms part of the first supply channel 65 for the first electrochemical fluid.

Each second through hole 17, 57 is preferably transverse, perpendicular to the largest dimension of the respective frame 10, 50, and forms part of the first discharge channel 85 for the first electrochemical fluid.

Each third through hole 18, 58 is preferably transverse, perpendicular to the largest dimension of the respective frame 10, 50, and forms part of the second supply channel 66 for the second electrochemical fluid.

Each fourth through hole 19, 59 is preferably transverse, perpendicular to the largest dimension of the respective frame 10, 50, and forms part of the second discharge channel 86 for the second electrochemical fluid.

According to one embodiment, the upper frame 10 comprises a distal portion 12 of the membrane 40 and a proximal portion 14 of the membrane 40.

The upper frame 10 comprises an inlet channel 60 for the first fluid supplying a lateral face of the first electrode 20, the inlet channel 60 comprising an outlet orifice 62 in the proximal portion 14 of the upper frame 10 opening onto a lateral face of the first electrode 20. The inlet channel 60 for the first fluid is typically in fluid communication with the supply channel 65 to allow the supply of the first electrochemical fluid for the first electrode 20.

The upper frame 10 also comprises an outlet channel 80 for the first fluid via a lateral face of the first electrode 20, the outlet channel 80 comprising an inlet orifice 82 in the proximal portion 14 opening onto a lateral face of the first electrode 20. The outlet channel 80 for the first fluid is typically in fluid communication with the discharge channel 85 to allow the discharge of the first electrochemical fluid from the first electrode 20.

The lower frame 50 comprises a distal portion 52 of the membrane 40 and a proximal portion 54 of the membrane 40.

The lower frame 50 comprises an inlet channel 61 for the second fluid supplying a lateral face of the second electrode 30, the inlet channel 61 comprising an outlet orifice 63 in the proximal portion 54 of the lower frame 50 opening onto a lateral face of the second electrode 30. The inlet channel 61 for the second fluid is typically in fluid communication with the second supply channel 66 to allow the supply of the second electrochemical fluid for the second electrode 30.

The lower frame 50 comprises an outlet channel 81 for the second fluid through a lateral face of the second electrode 30, the outlet channel 81 comprising an inlet orifice 83 in the proximal portion 54 opening onto a lateral face of the second electrode 30. The outlet channel 81 for the second fluid is typically in fluid communication with the second discharge channel 86 to allow the discharge of the second electrochemical fluid for the second electrode 30.

At least one, and preferably all, from among the inlet channel 60 and the outlet channel 80 of the upper frame 10 and the inlet channel 61 and the outlet channel 81 of the upper frame 50, comprises an inlet orifice 64, 67, respectively outlet orifice 84, 87, respectively, opening onto the supply channel 65, 66, respectively discharge channel 85, 86, in the distal portion 12, 52 of the frame 10, 50. Advantageously, the orifice 64, 67 in the distal portion 12, 52 opens onto the supply channel 65, 66, making up a supply inlet orifice for the fluid of the channel 60, 61, and the orifice 84, 87 in the distal portion 12, 52 opens onto the discharge channel 85, 86, making up a discharge outlet orifice for the fluid of the channel 80, 81.

Advantageously, the inlet 60, 61 and outlet 80, 81 channels have a length providing a sufficient electrical resistance to limit the shunt currents. The inlet 60, 61 and outlet 80, 81 channels must not be too long so that the head loss is not too great. One skilled in the art therefore seeks a compromise in this respect. As an example, the inlet 60, 61 and outlet 80, 81 channels have a length of about 1 to 500 millimeters.

According to one embodiment, the upper frame 10 and the lower frame 50 are kept securely in contact.

According to one particular variant, the upper frame 10 and the lower frame 50 are kept securely in contact by gluing or welding. For example, it is possible to heat seal the lower face of the upper frame 10 with the upper face of the lower frame 50. To heat seal the frames 10, 50, it is possible to use a polymer film (for example polyethylene terephthalate (PET), polyethylene naphthalate (PEN), Mylar®, etc.). Heat sealing advantageously makes it possible to close the shunt channel when it emerges in the proximal part on an opposite frame and thus to add an additional electrical resistance to the shunt channel.

"Opposite frame" refers to the lower frame 50 in reference to the upper frame 10 and the upper frame 10 in reference to the lower frame 50.

The frames 10, 50 include several housings in which seals are arranged. The arrangement of the seals will be described in more detail hereinafter.

Electrodes

Typically, the electrode 20, 30 is a porous electrode. Such an electrode is intended to receive an electrochemical fluid in its porosity.

According to one variant, the porous electrode 20, 30 is a porous carbon electrode, typically made up of a carbon felt or graphite felt. Such electrodes are known in the field of redox-flow electrochemical cells. Typically, such an electrode of a graphite felt has a thickness of 3 mm to 12 mm when it is not compressed and 2 mm to 6 mm when it is compressed, thus providing good electrical contact with a current collector plate.

Advantageously, the first electrode 20 is intended to receive a first electrochemical fluid and the second electrode 30 is intended to receive a second electrochemical fluid. The first and second electrochemical fluids may be identical or different.

According to one variant, the first electrode 20 and the second electrode 30 have a substantially identical or similar thickness.

According to one variant, the first electrode 20 has a width and/or a length that are substantially identical or similar to the width and/or the length, respectively, of the second electrode 30.

According to one variant, the first electrode 20 has a surface substantially identical or similar to the surface of the second electrode 30.

Typically, the first electrode 20 is in contact with the upper frame 10 by these outer edges, so as to be positioned edge to edge in the housing 13 of the upper frame 10.

Advantageously, the first electrode 20 is in contact with the outlet orifice 62 of the supply channel 60 and the inlet orifice 82 of the discharge channel 80.

Typically, the second electrode 30 is in contact with the lower frame 50 by these outer edges, so as to be positioned edge to edge in the housing 53 of the lower frame 50.

Advantageously, the second electrode 30 is in contact with the outlet orifice 63 of the supply channel 61 and the inlet orifice 83 of the discharge channel 81.

More specifically, the orifice 62, 63 in the proximal portion 14, 54 of the frame 10, 50 opens onto a proximal portion 24, 34 of the lateral face of the electrode 20, 30 and constitutes an outlet orifice for supplying the fluid of the channel 60, 61. The orifice 82, 83 in the proximal portion 14, 54 of the frame 10, 50 opens onto a proximal portion 24, 34 of the lateral face of the electrode 20, 30 and constitutes an inlet orifice for discharging the fluid from the channel 80, 81.

Membrane

The first electrode 20 and the second electrode 30 are separated from one another by a membrane 40, the first electrode 20 facing the membrane 40 by its lower face and the second electrode 30 facing the membrane 40 by its upper face.

The contact of the electrode 20, 30 with the membrane 40 may be direct or indirect. Thus, according to one embodiment, the electrode 20, 30 is in contact with the membrane 40 with no intermediate element. According to another embodiment, the electrode 20, 30 is in indirect contact with the membrane 40, separated by an intermediate element, for example a peripheral film arranged on the faces of the membrane 40.

Typically, the first electrode 20 is in direct contact with the membrane 40 and the second electrode 30 is in direct contact with the membrane 40. Thus, typically the membrane 40 has an upper surface 43 and a lower surface 41, the upper surface 43 being in contact with the first electrode 20 and the lower surface 41 being in contact with the second electrode 30.

For example, the membrane 40 is an ion exchange permeable membrane. For example, the membrane 40 is an ion exchange membrane comprising an organic polymer, and preferably a halogenated organic polymer, and still more preferably a fluorinated polymer. Such preferred polymers are known and commercially available, for example such as Nafion®.

According to one embodiment, the first electrode 20, the second electrode 30 and the membrane 40 are kept in contact by pressure. The contact by pressure is contact on at least a portion of the electrodes 20, 30.

Advantageously, the membrane 40 has an area larger than the area of the first electrode 20 and the second electrode 30, with the area of the membrane 40 not taking into account the porosity of the membrane 40.

According to another embodiment, the membrane 40 is positioned in contact with the frame 10, 50. The membrane 40 is advantageously captured between the two frames 10, 50.

At least one of the faces 43, 41 of the membrane 40 forms a wall of the inlet channel 60, 61 or of the outlet channel 80, 81.

For example, in FIGS. 1 and 3, the upper surface 43 of the membrane 40 forms part of the lower wall of the inlet channel 60 and of the outlet channel 80 of the first electrode 20. The lower surface 41 of the membrane 40 forms part of the upper wall of the inlet channel 61 and of the outlet channel 81 of the second electrode 30.

The inlet 60, 61 or outlet 80, 81 channel(s) opening onto the membrane 40 at the upper 43, respectively lower 41 face, are not located opposite a channel 60, 61, 80, 81 opening onto the membrane 40 at the lower 41, respectively upper 43 face. Thus, two channels 60 and 61 or 80 and 81 are not located opposite one another on either side of the membrane 40. The membrane 40 is still in contact at least at one of its faces 41, 43 with the material, typically with a frame 10, 50. The membrane 40 is therefore supported over its entire surface.

The electrochemical fluid is therefore sent into the frame 10, 50 by the distal part 12, 52, then passes through the frame 10, 50 in the proximal part 14, 54 to supply the electrode 20, 30. According to one variant, the electrochemical fluid circulating in the proximal portion 14, 54 is at least partly or entirely in contact with the two frames 10, 50. According to one variant, the electrochemical fluid circulating in the distal portion 12, 52 is at least partly or entirely in contact with the frame and the intercalary frame 500.

Intercalary Frames

The stack 100 includes an intercalary frame 500 arranged on the periphery of an intercalary plate 76 and housing said intercalary plate 76. The lower frame 50 of the first electrochemical cell 1 and the upper frame 10 of the second electrochemical cell 101 are separated at least in part by the intercalary frame 500.

The lower frame 50 of the first electrochemical cell 1 faces the intercalary frame 500 by its lower face and the upper frame 10 of the second electrochemical cell 101 faces the intercalary frame 500 by its upper face.

The intercalary frame 500 comprises an upper face 503 and a lower face 501. At least one of the faces 503, 501 of the intercalary frame 500 forms a wall of the inlet channel 60, 61 or of the outlet channel 80, 81.

In FIG. 1, the lower face 501 of the intercalary frame 500 forms the upper wall of the inlet channel 60 and of the outlet channel 80 of the upper frame 10 of the second electrochemical cell 101. The upper face 503 of the intercalary frame 500 forms the lower wall of the inlet channel 61 and of the outlet channel 81 of the lower frame 50.

Figure 7:
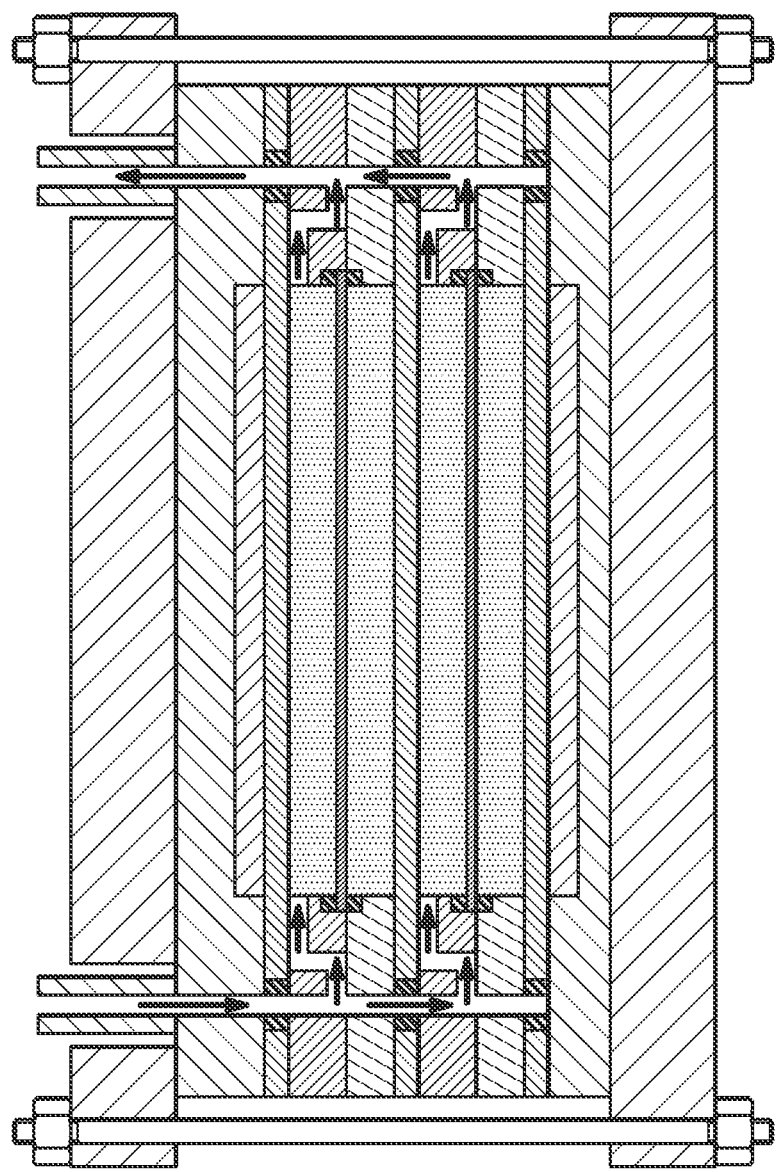
FIG. 7 shows a diagram of a longitudinal section of a stack according to the prior art.

According to the state of the art, as shown in FIG. 7, the filmed intercalary plate forms a wall of the inlet channel or of the outlet channel. A deterioration and/or a loosening of the plastic film then causes the electrochemical fluid to be placed in contact with the intercalary plate, and therefore its corrosion. Furthermore, due to the impossibility of protecting the edge of the plate, it is necessary to supply the electrode in its proximal part.

In general, the intercalary frame 500 is made from thermoplastic polymer, for example from polypropylene (PP). Preferably, the intercalary frame 500 is made from the same material as the upper frame 10 and/or the lower frame 50. The intercalary frame 500 is generally obtained by cutting by waterjet or laser of a plate with thickness E. In a variant, the intercalary frame 500 is molded.

The intercalary frame 500 is preferably made from unpigmented material, advantageously material transparent to laser radiation.

The intercalary frame 500 has a thickness E substantially equal to the thickness E' of the intercalary plate 76. The thicknesses E, E' are measured in a direction parallel to the stacking direction D. For example, the thickness E of the intercalary frame is between 0.5 mm and 2.0 mm. It is easy to adapt the thickness E of the intercalary frame 500 based on the thickness E' of the intercalary plate 76.

The intercalary frame 500 is positioned relative to the upper 10 and lower 50 frames using rods positioned in the corners.

According to one advantageous variant, the intercalary frame 500 is kept securely in contact with the lower frame 50 of the first electrochemical cell 1 and the upper frame 10 of the second electrochemical cell 101 by plastic welding, typically by laser welding. The absorption of the laser radiation is made easier when the intercalary frame 500 is made from transparent material and the frame 10, 50 is made from colored material, typically black. The welding makes it possible to eliminate the seals and reliabilize the sealing.

Intercalary Plates

The intercalary plate 76 is arranged between the first electrochemical cell 1 and the second electrochemical cell 101.

The intercalary plate 76 has an upper face 376 and a lower face 176.

The lower surface 31 of the second electrode 30 of a first electrochemical cell 1 is in contact with the upper surface 376 of the intercalary plate 76, forming a reactive electrode (where the electrochemical reaction takes place).

The upper surface 123 of the first electrode 120 of the second electrochemical cell 101 is in contact with the lower surface 176 of the intercalary plate 76.

Preferably, the intercalary plate 76 has a width and/or a length greater than or equal to the width and/or the length of the electrode 20, 30. According to one variant, the intercalary plate 76 has a surface substantially greater than or equal to the surface of the electrode 20, 30.

According to one advantageous embodiment, the intercalary plate 76 has a surface area of between 110% and 130% of the area of the electrode 20, 30. The intercalary plate 76 protrudes very little past the electrode 20, 30 and is thus nearly limited to the reactive zone. According to one embodiment, the contact surface between the intercalary plate 76 and the lower 50 and upper 10 plates is just sufficient to maintain the intercalary plate 76 securely between the two lower 50 and upper 10 plates and to ensure the tightness with respect to the contained electrochemical fluid from each electrode 30, 120 in contact with the intercalary plate 76.

Typically, the intercalary plate 76 is partially in contact with the upper frame 10 of the second electrochemical cell 101 by its lower face 176 and with the lower frame 50 of the first electrochemical cell 1 by its upper face 376. The intercalary plate 76 is positioned edge to edge in the housing of the intercalary frame 500. Advantageously, the intercalary plate 76 is positioned such that there is sufficient clearance, for example from 1 mm to 4 mm, between the outer edges of the intercalary plate 76 and the edges of the housing of the intercalary frame 500, so that the intercalary plate 76 does not overlap the intermediate frame 500.

Typically, the intercalary plate 76 is made up of or comprises a conductive element, for example a metal element, typically copper, optionally in alloyed form and/or provided with a coating, and/or a graphite or a composite material comprising graphite. Advantageously, the intercalary plate 76 is made from a graphite composite.

The intercalary plate 76 is advantageously a bipolar collector plate.

Advantageously, the intercalary plate 76 has no plastic film.

Figure 4:
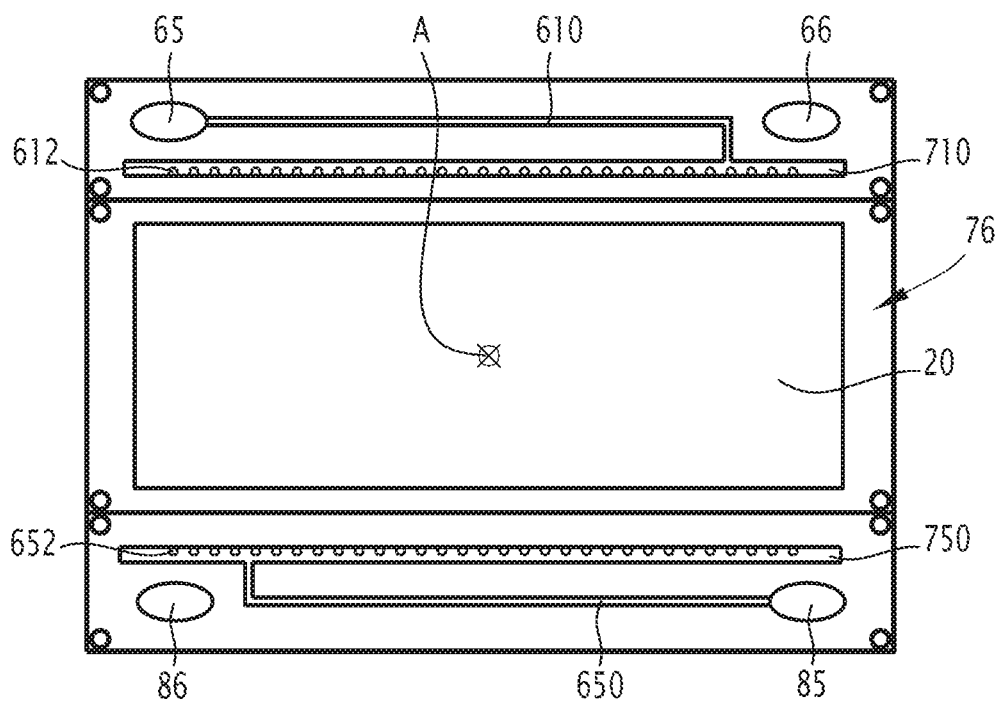
FIG. 4 shows a diagram of a top view of a frame on the side of the distal portion of the frame according to one specific embodiment of the invention.
Figure 5:
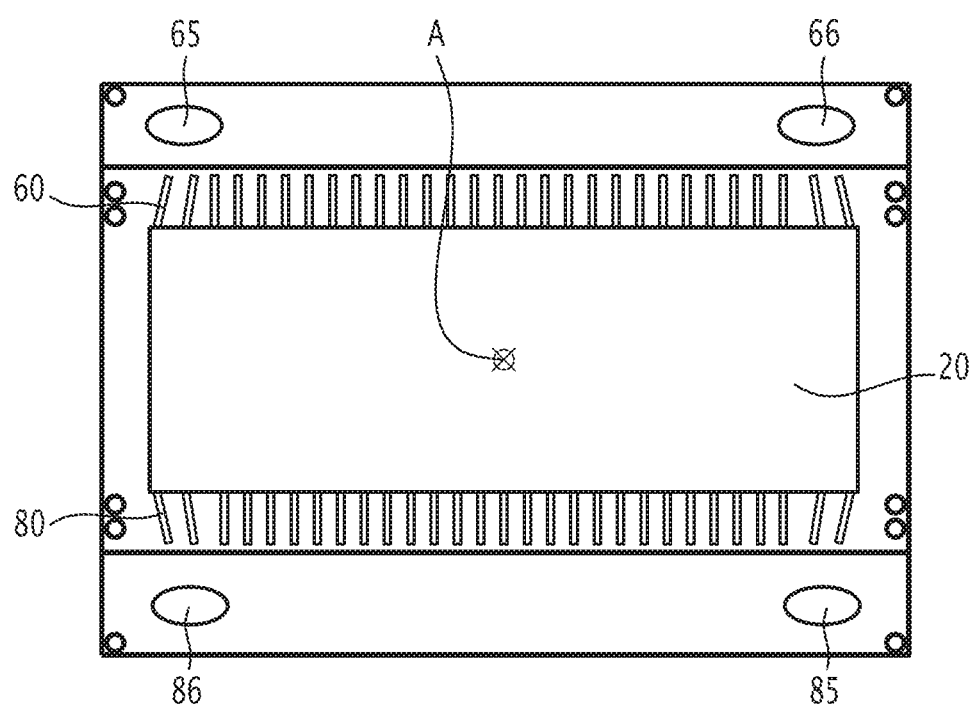
FIG. 5 shows a diagram of a bottom view of a frame on the side of the proximal portion of the frame, according to one specific embodiment of the invention.

In reference in particular to FIGS. 4 and 5, the supply channel 65, 66 and/or the discharge channel 85, 86 comprise an inlet 610, respectively outlet 650 shunt channel, which forms a bypass in the distal portion 12, 52 of the frames 10, 50 making it possible to offset the inlet and/or outlet orifice, respectively, preferably toward the other end of the side face of the electrodes 20, 30 and to open onto the proximal part 14, 54 of the frames 10, 50 on a supply 710, respectively discharge 750 chamber.

The supply 710, respectively discharge 750 chamber includes a multitude of inlet and/or outlet channels at the respective orifices 612, 652, so as to distribute the fluid as homogeneously as possible supplying the lateral face of the electrodes 20, 30, in their proximal portion 24, 34. Such supplies advantageously have a so-called rake shape.

The length and the section of the shunt channel 610, 650 depend on the conductivity of the electrochemical fluids and the stack 100 of cells 1, 101 (therefore the voltage of the stack). The greater the stack 100 is, the stronger the shunt currents are, therefore the more the electrical resistance between cells 1, 101 must be increased. In other words, the longer the shunt channel 610, 650 must be and/or the smaller the section of the channel 610, 650 must be. The counterpart is an increased head loss of the stack. A compromise must therefore be struck between minimizing the shunt currents and minimizing the consumption of the pumps. A compromise must also be found regarding the maximum number of cells 1, 101 to be stacked.

It is preferred for the length of the channel in the distal portion 12, 52 to be as long as possible, since it participates directly in increasing the inter-cell electrical resistance, therefore increases the shunt, and for that in the proximal portion 14, 54 to be as short as possible, since it participates little in the shunt due to the small cumulative width of the channels. Typically, the shunt channel 610, 650 measures between 100 and 500 mm.

Advantageously, the shunt channel 610, 650 has a reduced cross-section, typically between 5 mm$^2$ and 15 mm$^2$.

According to one advantageous embodiment shown in FIG. 4, the assembly formed by the first supply channel 65, the inlet shunt channel 610 and the first supply chamber 710 is arranged opposite the assembly formed by the first discharge channel 85, the outlet shunt channel 650 and the first discharge chamber 750 relative to the central axis A of the stack 100, i.e., it is substantially the mirror image of the assembly formed by the first discharge channel 85 and the outlet shunt channel 620 by rotation by an angle of 180° around the central axis A.

Likewise, preferably, the assembly formed by the second supply channel 66 and the corresponding inlet shunt channel (not shown) is arranged opposite the assembly formed by the second discharge channel 86 and the corresponding outlet shunt channel (not shown) relative to the central axis A of the stack 100, i.e., it is substantially the mirror image of the assembly formed by the second discharge channel 86 and the corresponding outlet shunt channel by rotation by an angle of 180° around the central axis A.

Owing to this configuration, the electrochemical fluid travels substantially the same distance between the inlet orifice 64, 67 and the outlet orifice 84, 87 irrespective of the inlet channel used.

At least one of the faces 501, 503 of the intercalary frame 500 forms a wall of the shunt channel 610, 650.

Advantageously, the stack of frames 10, 50, 500 forms a channel.

Preferably, the stack of electrochemical cells 1, 101, and in particular the stack of first supply holes 16, 56 and second discharge holes 17, 57, respectively forms a first supply channel 65 for a first electrochemical fluid and a first discharge channel 85 for a first electrochemical fluid, said first electrochemical fluid being contained in the first electrode 20. Preferably, the stack 100 of electrochemical cells 1, 101, and in particular the stack of third supply holes 18, 58 and fourth discharge holes 19, 59, respectively forms a second supply channel 66 for a second electrochemical fluid and a second discharge channel 86 for a second electrochemical fluid, said second electrochemical fluid being contained in the second electrode 30.

The supply channels 65, 66 and the discharge channels 85, 86 can each be independently in fluid communication with storage or refill reservoirs respectively for a first electrochemical fluid for example containing one or several electrolytes and a second electrochemical fluid for example containing one or several electrolytes, the first and second electrochemical fluids being able to contain identical or different chemical species, in particular electrolytes.

Ends

According to one embodiment, the upper surface 23 of the first electrode 20 of a first electrochemical cell 1 is in contact with the lower surface 175 of an upper intercalary plate 75, forming a reactive electrode (where the electrochemical reaction takes place).

The upper surface 375 of the upper intercalary plate 75 is in contact with the lower surface 171 of an upper electric current collector plate 70.

The lower surface 131 of the second electrode 130 of a second electrochemical cell 101 is in contact with the upper surface 378 of a lower intercalary plate 78, forming a reactive electrode (where the electrochemical reaction takes place).

The lower surface 178 of the lower plate 78 is in contact with the upper surface 363 of a lower electric current collector plate 71.

Typically, the current collector plates 70, 71 are made up of or comprise a conductive element, for example a metal element, optionally in alloy form, and/or a graphite or a composite material comprising graphite. In general, this is a good conductor element, typically copper.

The stack 100 advantageously also includes a supply frame 510 and a closing frame 550.

According to one embodiment, the supply frame 510 has a thickness substantially equal to the sum of the thickness of the upper intercalary plate 75 and the thickness of the upper collector plate 70, the thicknesses being measured in a direction parallel to the stacking direction D.

According to one embodiment, the supply frame 510 has a first supply 565, respectively discharge 585 opening, opening onto the first supply 65, respectively discharge 85 channel, and a second supply, respectively discharge opening (not shown) opening onto the second supply 66, respectively discharge 86 channel.

According to one embodiment, the closing frame 550 has a thickness substantially equal to the sum of the thickness of the lower intercalary plate and the thickness of the lower collector plate 71, the thicknesses being measured in a direction parallel to the stacking direction D.

According to one embodiment, the closing frame 550 has no orifice opening onto the supply channel 65, 66 or the discharge channel 85, 86. Thus, the closing frame 550 closes the fluid channels 65, 66, 85, 86 of the stack.

Arrangement of the Seals

The arrangement of the sealing gaskets of the stack 100 will now be described.

The sealing of the stack 100 is provided by seals, the grooves of which are shaped in the frames or by a plastic-plastic weld.

Figure 6:
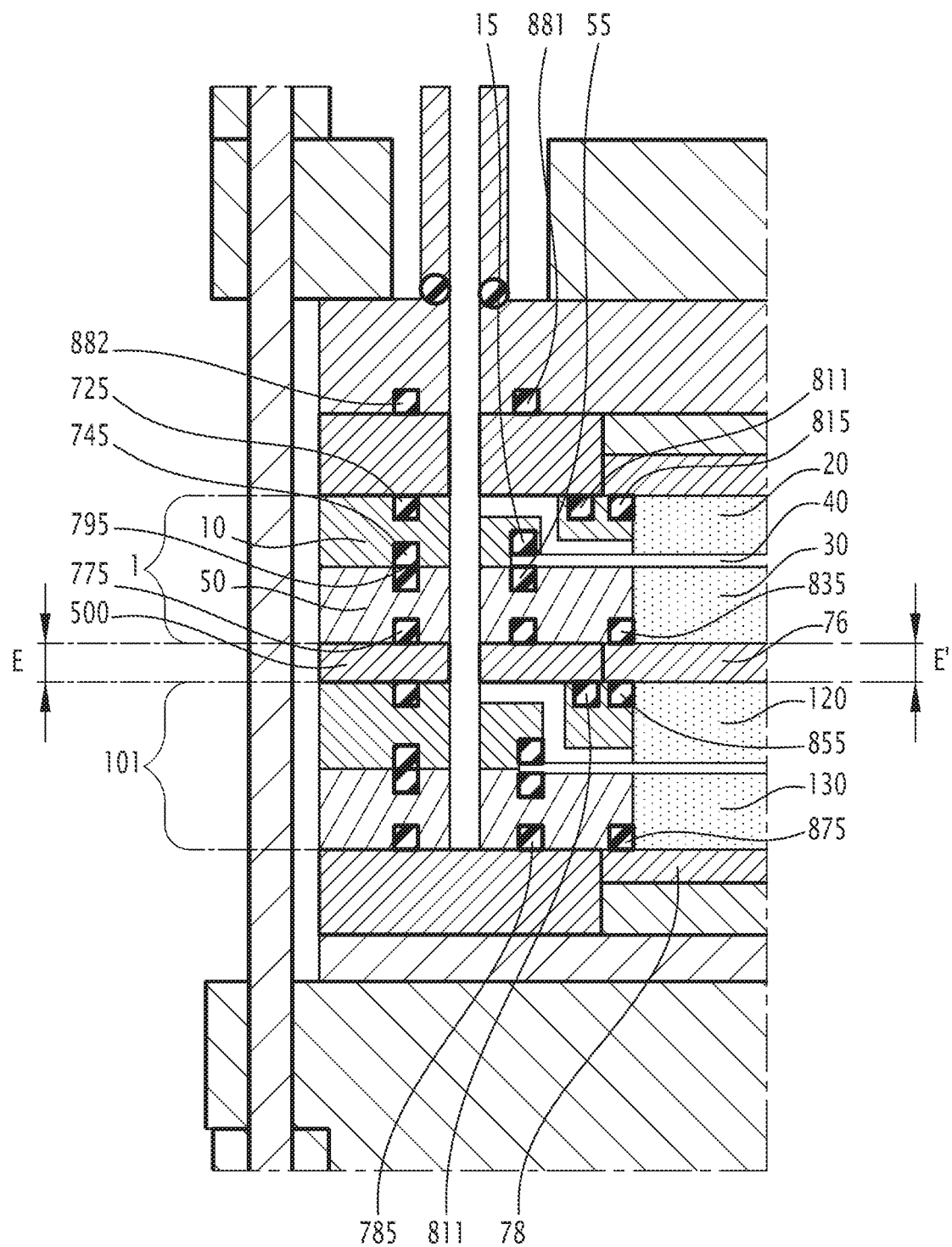
FIG. 6 shows a diagram of a portion of FIG. 1, enlarged, at the supply channel.

FIGS. 1 and 6 show, by way of illustration, one particular arrangement of the sealing gaskets.

Advantageously, the upper frame 10 comprises a housing for a sealing gasket 15 and the lower frame 50 comprises a housing for a sealing gasket 55, the sealing gaskets 15, 55 being in contact with the membrane 40.

The sealing gasket 15, 55 makes it possible to avoid an electrochemical fluid leak coming from the upper frame 10, and more specifically from the inlet 60 or outlet 80 channel, toward the second electrode 30, or vice versa, from the lower frame 50, and more specifically from the inlet 61 or outlet 81 channel, toward the first electrode 20, without passing through the membrane 40. Thus, the sealing gasket 15, 55 prevents the fluid bypass of the membrane 40.

The sealing gasket 15, 55 housing advantageously forms a receiving groove of the sealing gasket 15, 55.

According to one variant, the housing forms a recess made in the frame 10, 50 able to receive an annular sealing gasket 15, 55.

The frame 10, 50 may comprise several seal 15, 55 housings.

The sealing gasket 15, 55 provides the inner sealing between the membrane 40 and the frame 10, 50 respectively in order to prevent a fluid flow, of the electrochemical fluid type, outside the contact zone of the membrane 40 with the electrodes 20, 30.

The membrane 40 is advantageously captured between the two frames 10, 50, and in particular in contact at least at one point with the sealing gasket 15, 55.

Advantageously, the membrane 40 has a periphery substantially identical or similar to the periphery of the sealing gasket(s) 15, 55 of the membrane 40. The periphery of the membrane 40 can be in contact with the inner sealing gasket(s) 15, 55 of the membrane 40. Thus, the membrane 40 can have a smaller size that optimizes the active surface of the membrane 40 relative to its total surface and decreases the production costs. For example, the pressure to keep the frames 10, 50 in contact with the membrane 40 makes it possible to "pinch" the periphery of the membrane 40 between the inner sealing gaskets 15, 55.

The frame 10, 50 advantageously comprises one or several sealing gaskets 725, 775 arranged in seal grooves, providing the outer sealing of the fluid circulation in the supply channel 65, 66 and/or the discharge channel 85, 86 at the distal portion 12, 52 of the frame 10, 50.

The frame 10, 50 advantageously comprises one or several sealing gaskets 745, 795 arranged in seal grooves, providing the outer sealing of the fluid circulation in the supply channel 65, 66 and/or the discharge channel 85, 86 at the proximal portion 14, 54 of the frame 10, 50.

The seals 15, 55 providing the inner sealing prevent any contact between the anode zone and the cathode zone. The seals 725, 745, 775, 795 providing the outer sealing prevent any contact with the ambient atmosphere and the leaks of electrochemical fluids toward the outside of the cell 1, 101.

Advantageously, the upper frame 10 also includes a seal 811 arranged in a seal groove and providing the sealing of the circulation of fluid in the inlet 60, respectively outlet 80 channel, in the distal portion 12 of the upper frame 10, more specifically at the contact surface between the intercalary 500 or supply 510 frame and the upper frame 10.

Advantageously, the lower frame 50 includes a sealing gasket 785 arranged in a seal groove and providing the sealing of the fluid circulation in the supply channel 65 and/or the discharge channel 85 at the distal portion 52 of the frame 50.

The frame 10, 50 advantageously comprises one or several sealing gaskets 815, 835, 855, 875 providing the sealing at the contact surface between the upper frame 10 and/or the lower frame 50 and the intercalary plate 75, 76, 78.

According to one specific embodiment, the sealing gasket 815 provides the sealing at the contact surface between the upper frame 10 of the first electrochemical cell 1 and the upper intercalary plate 75.

According to one specific embodiment, the sealing gasket 835 provides the sealing at the contact surface between the lower frame 50 of the first electrochemical cell 1 and the intercalary plate 76.

According to one specific embodiment, the sealing gasket 855 provides the sealing at the contact surface between the upper frame 10 of the second electrochemical cell 101 and the intercalary plate 76.

According to one specific embodiment, the sealing gasket 875 provides the sealing at the contact surface between the lower frame 50 of the second electrochemical cell 101 and the lower intercalary plate 78.

The seals 815, 835, 855, 875 are for example arranged in seal grooves of the upper 10 and lower 50 frames.

Optionally, a seal can be added between the shunt channel and the chamber to prevent the fluid from short-circuiting the shunt channel.

Another arrangement of the sealing gaskets can also be considered.

Battery

The invention also relates to a flow-redox battery 2 including such a stack 100.

Advantageously, the battery according to the invention comprises a supply plate 180 and a closing plate 160 that are arranged on either side of the stack 100.

Typically, the supply plate 180 is in contact by its upper surface 181 in part with the upper surface 173 of the upper collector plate 70 and in part with the upper surface of the supply frame 510. The supply plate 180 is in contact by its upper surface 183 with the lower surface 111 of a flange 110.

Typically, the closing plate 160 is in contact by its upper surface 163 in part with the lower surface 361 of the lower collector plate 71 and in part with the lower surface of the closing frame 550. The closing plate 160 is in contact by its lower surface 161 with the upper surface 113 of a flange 210.

The supply plate 180 in particular makes it possible to bring the fluids to the stack, and to isolate the upper collector plate 70 electrically from the clamping flanges 110 tightened with nuts 200, preferably metal nuts 200. The closing plate 160 has the same functions by isolating the lower collector plate 71 from the clamping flanges 210.

For example, the maintenance of the first 20 and second 30 electrodes in contact is provided by a clamping flange 110 of the frame.

Typically, a clamping flange 110 keeps a stack of electrochemical cells and current collector plates in compression.

According to one specific embodiment, the supply plate 180 advantageously comprises one or several sealing gaskets 881, 882 arranged in seal grooves and providing the outer sealing of the fluid circulation in the supply channel 65, 66 and/or the discharge channel 85, 86 at the contact surface between the supply plate 180 and the supply frame 510.

The present invention is in particular applicable to the field of electrochemical cells, and more particularly relates to redox-flow electrochemical cells.

The present invention also relates to fuel cells comprising cells according to the invention. The present invention further relates to electrolytic cells.

The invention claimed is:

1. A stack of several electrochemical cells, the electrochemical cells being stacked on top of one another in a stacking direction, the stack comprising at least:
   a first electrochemical cell,
   a second electrochemical cell, and
   an intercalary plate,
   each cell including an upper frame housing a first electrode and a lower frame housing a second electrode, the first electrode and the second electrode being separated from one another by a membrane, the first electrode being in contact with the membrane by its lower face and the second electrode being in contact with the membrane by its upper face, the second electrode of the first electrochemical cell and the first electrode of the second electrochemical cell being separated by the intercalary plate,
   wherein the stack includes an intercalary frame arranged on the periphery of the intercalary plate, the lower frame of the first electrochemical cell and the upper frame of the second electrochemical cell being separated at least in part by the intercalary frame, the lower frame of the first electrochemical cell facing the intercalary frame by its lower face and the upper frame of the second electrochemical cell facing the intercalary frame by its upper face,
   wherein the upper frame and the lower frame of each electrochemical cell are separated from one another by the membrane,
   wherein each upper and lower frame comprises a proximal portion close to the membrane and a distal portion distant from the membrane,
   wherein each upper and lower frame comprises a supply channel for supplying an electrochemical fluid and an inlet channel for a fluid supplying a lateral face of the electrode, the inlet channel comprising an outlet orifice in the proximal portion opening onto a lateral face of the electrode,
   wherein each upper and lower frame comprises a discharge channel for an electrochemical fluid and an outlet channel for the fluid via a lateral face of the electrode, the outlet channel comprising an inlet orifice in the proximal portion opening onto a lateral face of the electrode, and
   wherein the inlet channel comprises an inlet orifice opening onto the supply channel in the distal portion of the upper or lower frame and/or the outlet channel comprises an outlet orifice opening onto the discharge channel in the distal portion of the upper or lower frame.

2. The stack according to claim 1, wherein the outlet orifice of the supply channel of at least one upper or lower frame opens onto the membrane and/or the inlet orifice of the discharge channel of at least one upper or lower frame opens onto the membrane.

3. The stack according to claim 2, wherein the membrane comprises an upper face and a lower face, the inlet or outlet orifice(s) emerging on the membrane at the upper, face not being located opposite an orifice opening onto the membrane at the lower face, and the inlet or outlet orifice(s) emerging on the membrane at the lower face not being located opposite an orifice opening onto the membrane at the upper face.

4. The stack according to claim 2, wherein the outlet orifice of the supply channel and the inlet orifice of the discharge channel of at least one upper or lower frame open onto the membrane.

5. The stack according to claim 1, wherein the intercalary frame comprises an upper face and a lower face, at least one of said faces forming a wall of the inlet channel or the outlet channel.

6. The stack according to claim 1, wherein the inlet channel comprises an inlet orifice, opening onto the supply channel in the distal portion of the upper or lower frame, and the outlet channel comprises an outlet orifice, opening onto the discharge channel in the distal portion of the upper or lower frame.

7. The stack according to claim 1, wherein the intercalary frame has a thickness greater than or equal to the thickness of the intercalary plate, said thicknesses being measured in a direction parallel to the stacking direction.

8. The stack according to claim 7, wherein the intercalary frame has a thickness equal to the thickness of the intercalary plate, said thicknesses being measured in a direction parallel to the stacking direction.

9. The stack according to claim 1, wherein each upper and lower frame includes a housing for a sealing gasket, the sealing gaskets being in contact with the membrane.

10. The stack according to claim 1, further including an upper current collector plate, a lower current collector plate, an upper intercalary plate and a lower intercalary plate, the upper current collector plate being in contact with an upper intercalary plate, arranged between said collector plate and the first electrode, the lower current collector plate being in contact with a lower intercalary plate, arranged between said lower collector plate and the second electrode, the stack including a supply frame arranged on the periphery of the assembly formed by the upper collector plate and the upper intercalary plate, and a closing frame arranged on the periphery of the assembly formed by the lower collector plate and the lower intercalary plate.

11. The stack according to claim 10, wherein the closing frame has no orifice opening onto the supply channel or the discharge channel.

12. A redox-flow battery including a stack according to claim 1.

13. A method for producing electricity comprising implementing a battery according to claim 12.

14. A method for producing electricity comprising implementing a stack as defined according to claim 1.

* * * * *